United States Patent Office 3,300,376
Patented Jan. 24, 1967

3,300,376
CONTROLLING BACTERIA WITH ALKYLENE-GLYCOL CARBONATE ESTERS OF 2,2'-THIO-BIS-(DICHLOROPHENOLS)
Robert M. Schisla, Kirkwood, and Van R. Gaertner, Ballwin, Mo., assignors to Monsanto Company, St. Louis, Mo., a corporation of Delaware
No Drawing. Filed Sept. 11, 1964, Ser. No. 395,951
4 Claims. (Cl. 167—30)

This application is a continuation-in-part of copending application Serial No. 70,921, filed November 22, 1960, now U.S. 3,170,945.

This invention relates to organic carbonate esters of thiobis(dichlorophenols), and to a method for controlling undesirable bacteria by the use of bacteriostatic compositions containing the organic carbonate esters of a thiobis(dichlorophenol).

Organic carbonate compounds containing sulfur, and available reactive hydroxyl groups are formed when a 2,2'-thiobis(dichlorophenol) is reacted with a glycol bis-(chloroformate) compound to form a compound having the formula

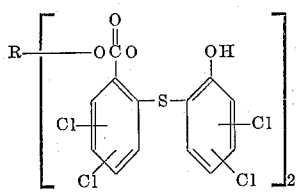

wherein R is selected from the group consisting of bivalent alkylene, alkylene-O-alkylene, and polyalkylene-O-alkylene radicals having from 2 to 4 carbon atoms in each alkylene group and from 3 to 10 alkylene groups. These compounds not only posses superior bacteriostatic activity but they are also resistant to the oxidative action of bleaches and hence are particularly useful in detergent compositions since they neither impart a color change nor an odor to detergent solutions.

In these compounds R is a radical derived from an alkylene glycol, alkylene-oxy-alkylene glycol or a polyalkylene-oxy-alkylene glycol which is reacted with phosgene according to known procedures to prepare alkylene, alkylene-oxy-alkylene or polyalkylene-oxy-alkylene glycol bis(chloroformate) compounds used as a reactant in preparing compounds of this invention. The polyalkylene-oxy-alkylene glycol preferably contains from 3 to 10 alkylene groups having from 2 to 4 carbon atoms in each alkylene group. For example, when 2,2'-thiobis(3,5-dichlorophenol) is reacted with pentaethylene glycol bis-(chloroformate), there is obtained as product the carbonate ester, pentaethylene glycol bis[3,5-dichloro-6-(4,6-dichloro-2-hydroxyphenylthio)phenyl carbonate].

The 2,2'-thiobis(dichlorophenol) compounds employed in the reaction are illustrated by the following examples: 2,2'-thiobis(4,6-dichlorophenol), 2,2'-thiobis(5,6-dichlorophenol), and 2,2'-thiobis(3,5-dichlorophenol). The thiobis(dichlorophenols) are readily obtainable, known compounds which may be prepared by reaction of sulfur monochloride or dichloride with the appropriate dichlorophenol or by nuclear chlorination of thiobisphenol to give dichlorination in each of the benzene nuclei.

The reaction of the glycol bis(chloroformate) compounds with the 2,2'-thiobis(dichlorophenol) compounds is generally rather exothermic, so that this reaction is normally conducted in an inert solvent medium under carefully controlled temperature conditions. In general, a temperature within the range of from −10 to 50° C. is used and preferably the temperature is maintained within the range of from 0 to 20° C. at atmospheric pressure. However, elevated or reduced pressure may be used. The solvent used should be one in which the 2,2'-thiobis(dichlorophenol) compound is soluble, and is preferably one which also functions as an acid acceptor substance to take up by-product hydrogen halide, for example, pyridine, N,N-dimethylaniline, etc.; however, other solvents such as benzene, toluene, hexane, diethyl ether, and the like can also be used provided there is also present a sufficient amount of the acid acceptor substance.

The reaction is normally conducted by either dissolving or suspending the 2,2'-thiobis(dichlorophenol) compound in a suitable solvent and adding the glycol bis(haloformate) slowly under constant agitation and carefully controlled temperature conditions involving removing the exothermic heat of reaction. Completion of the reaction can be readily determined by observing the cessation of a slight temperature rise upon continued addition of haloformate, or the amount of hydrogen halide by-product which is produced.

As examples of compounds prepared as described above may be mentioned the following: ethylene glycol bis[3,5-dichloro-2-(3,5-dichloro-2-hydroxyphenylthio)phenyl carbonate], diethylene glycol bis[2,4-dichloro-6-(3,5-dichloro-2-hydroxyphenylthio)phenyl carbonate], triethylene glycol bis[2,4-dichloro-6-(3,4-dichloro-2-hydroxyphenylthio)phenyl carbonate], pentapropylene glycol bis[3,4-dichloro-2-(4,5-dichloro-2-hydroxyphenylthio)phenyl carbonate], octabutylene glycol bis[3,6-dichloro-2-(3,6-dichloro-2-hydroxyphenylthio)phenyl carbonate], and decaethylene glycol bis[3,4-dichloro-2-(3,5-dichloro-2-hydroxyphenylthio)phenyl carbonate].

The present organic carbonate esters of the 2,2'-thiobis(dichlorophenol) compounds are well defined waxy to crystalline (generally crystalline) compounds which are insoluble in water but are soluble in ether and in acetone. These compounds are especially useful as bacteriostatic agents, but also show activity as insecticides, particularly against mosquitos, and also some herbicide activity.

The preparation of and usefulness of these compounds are illustrated by the following examples.

Example 1

To a mixture of 71.2 g. (0.2 mole) of 2,2'-thiobis(4,6-dichlorophenol) in 600 ml. of pyridine there was slowly added 23.1 g. (0.1 mole) of diethylene glycol bis(chloroformate) while stirring and cooling the mixture to keep the temperature below 20° C. When the addition was completed, the mixture was stirred overnight (18 hours total reaction time) and then the pyridine reagent removed under reduced pressure with mild heating. The residue was hydrolyzed with 3 N sodium hydroxide, and washed several times with 800–1000 ml. portions of ether and the aqueous layer was separated and discarded. The ether extracts were combined and washed several times with 500 ml. portions of 1.5 N sodium hydroxide and 1.5 N hydrochloric acid to remove reaction impurities. The ether solvent was stripped off and the residue was dried in a vacuum oven overnight. The desired product, diethylene glycol bis[2,4-dichloro-6-(3,5-dichloro-2-hydroxyphenylthio)phenyl carbonate], M.P. 85–86° C., 54.3 g., was a flaky solid, and analyzed as follows:

Analysis.—Calc'd for $C_{30}H_{18}Cl_8O_9S_2$—percent C, 41.40; percent H, 2.08; percent Cl, 32.59; percent S, 7.36. Found: percent C, 41.67; percent H, 2.40; percent Cl, 32.10; percent S, 7.30.

Example 2

For this example, the compound diethylene glycol bis [2,4 - dichloro - 6 - (3,5-dichloro-2hydroxyphenylthio) phenyl carbonate] was tested to determine its bacteriostatic activity in the prseence of soap using the following procedure:

Briefly, the test consists essentially of adding a stated amount of the compound to a soap solution and preparing serial dilutions of this composition in agar. The agar dilutions are then inoculated with different microbes, incubated at a definite temperature for a definite time, after which the highest dilution of the test compound to inhibit growth of the test organism is determined and reported.

Test cultures of *Staphylococcus aureus* and *Salmonella typhosa* were prepared from stock cultures by inoculating a fresh slant 24 hours in advance and incubating at 37° C. A bacterial suspension of the test organisms was prepared by adding 10 ml. of sterile distilled water to the test culture and suspending the bacteria with the aid of an inoculating loop or needle. One drop of this suspension in a Petri dish serves as the inoculum.

Sterile slants of a nutrient agar used as the culture medium for the bacteria test organisms were prepared by transferring some of the growth of the test organism from the culture medium slant to the fresh agar slant. These freshly inoculated slants were incubated for 24 hours at 37° C.

A stock solution of the test compound was prepared by dissolving 0.200 g. of the compound in 10 ml. of a suitable solvent, e.g., acetone. One ml. of this stock solution was added to 9 ml. of a sterile soap solution, prepared by dissolving 5 g. of a fatty acid soap (Ivory Snow) in 90 ml. of distilled water. These dilutions gave a 1:50 rate of compound to soap.

Several test dilutions of soap solution containing the test compound, and another identically prepared soap solution containing no test compound in nutrient agar were prepared and poured into individual standard size sterile Petri dishes and permitted to harden. Each agar plate was inoculated with the test organism, incubated as described above, for 48 hours, and visually examined to determine the highest dilution which inhibits growth.

By such test procedure, diethylene glycol bis[2,4-dichloro - 6 - (3,5 - dichloro - 2 - hydroxyphenylthio)phenyl carbonate] was effective for inhibiting the growth of *Salmonella typhosa* at 1 part of the compound per 10,000 parts of the soap. Against *Staphylococcus aureus* the compound was effective at a dilution of 1 part of the compound per 1 million parts of the soap.

The present organic carbonate compounds need not, however, be first isolated before being applied as bacteriostatic agents. They can be used in the form of either liquids or dusts containing the compounds admixed with a suitable liquid or finely-divided solid adjuvant carriers. These liquid and dust compositions can also contain, in addition to the regular adjuvants, other additaments, such as bleaches, for particular applications. These compounds are particularly adaptable to be incorporated in small amounts, of the order of from 1% down to 0.1% or less, in detergent compositions where bacteriostatic action is required, for example, in household liquid detergent compositions, and in laundry detergent compositions. The detergent compositions to which these compounds may be added are the so-called water-soluble salts of the soap making art and include sodium, potassium, ammonium, and amine salts of the higher fatty acids, that is, those having from 8 to 20 carbon atoms per molecule, as well as the anionic and cationic detergent compositions. Moreover, by reason of the substantivity of the present compositions, they are particularly effective when employed in the process of washing textiles with soaps or with synthetic detergents of all types. Soaps or synthetic detergent compositions may be prepared containing the present organic carbonate compounds either in the form of soap or in detergent aqueous washing solutions or in the dry form, for example, in bar or powdered detergent form. Soaps suitable for the present purpose are the conventional fatty acid soaps, while the detergents may be either nonionic or anionic washing materials. Conventional nonionic detergents comprise the alkylene oxide, particularly ethylene oxide condensation products of fatty acid alcohols or acids having more than 8 carbon atoms in the molecule. Well known anionic detergents comprise alkali metal or amine salts of sulfonated alkylated aromatic hydrocarbons. Either product may contain a considerable quantity of builder salts such as, for example, sodium sulfate, sodium tripolyphosphate, sodium tetrapyrophosphate, sodium carbonate, sodium silicate, as well as pigments, such as titanium dioxide, and perfume oils.

For example, working according to Example 1 above, but reacting ethylene glycol bis(chloroformate) rather than the diethylene glycol bis(chloroformate) with the 2,2'-thiobis(4,6-dichlorophenol), there is obtained as product ethylene glycol bis[2,4-dichloro-6-(3,5-dichloro-2-hydroxyphenylthio)phenyl carbonate], M.P. 270–272° C. decomposed, and which analyzed as containing 6.46% sulfur as compared to 7.776%, the calculated value.

We claim:
1. A method for inhibiting the growth of bacteria which comprises applying to the situs of the bacteria a bacteriostatic amount of a compound of the formula

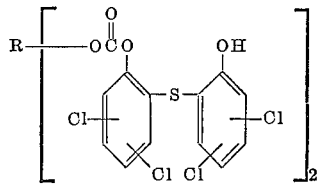

wherein R is selected from the group consisting of bivalent alkylene and alkylene-oxy-alkylene radicals having from 2 to 4 carbon atoms in each alkylene group, and polyalkylene-oxy-alkylene radicals having from 3 to 10 alkylene groups, and from 2 to 4 carbon atoms in each alkylene group.

2. A method for inhibiting the growth of bacteria which comprises applying to the situs of the bacteria a bacteriostatic amount of a polyethylene glycol carbonate ester of a 2,2'-thiobis(dichlorophenol).

3. A method for inhibiting the growth of bacteria which comprises applying to the situs of the bacteria a bacteriostatic amount of diethylene glycol bis[2,4-dichloro-6-(3,5-dichloro-2-hydroxyphenylthio)phenyl carbonate].

4. A method according to claim 1 wherein the bacteriostatic amount of diethylene glycol bis[2,4-dichloro-6 - (3,5-dichloro-2-hydroxyphenylthio)phenyl carbonate] is applied in a detergent composition.

No references cited.

LEWIS GOTTS, *Primary Examiner.*

S. K. ROSE, *Assistant Examiner.*